(12) United States Patent
Yeh

(10) Patent No.: US 7,206,478 B2
(45) Date of Patent: Apr. 17, 2007

(54) APPARATUS AND METHOD FOR MONITORING OPTICAL NETWORK

(75) Inventor: Chien-Hung Yeh, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 11/163,511

(22) Filed: Oct. 21, 2005

(65) Prior Publication Data

US 2007/0053631 A1   Mar. 8, 2007

(30) Foreign Application Priority Data

Sep. 5, 2005   (TW) .............................. 94130271 A

(51) Int. Cl.
*G02B 6/28* (2006.01)
(52) U.S. Cl. ..................... 385/24; 385/37; 359/341
(58) Field of Classification Search ................ 385/24, 385/37; 359/341
See application file for complete search history.

(56) References Cited

U.S. PATENT DOCUMENTS

| | | | | |
|---|---|---|---|---|
| 5,570,217 A | 10/1996 | Fleuren | ...................... | 398/13 |
| 5,673,108 A | 9/1997 | Takeuchi | .................... | 356/73.1 |
| 6,009,220 A | 12/1999 | Chan et al. | .................... | 385/24 |
| 6,028,661 A | 2/2000 | Minami et al. | ............ | 356/73.1 |
| 6,310,702 B1 | 10/2001 | Minami et al. | ............... | 398/13 |
| 6,771,538 B2 | 8/2004 | Shukuri et al. | ........ | 365/185.05 |
| 7,068,886 B2* | 6/2006 | Oh et al. | ....................... | 385/37 |

OTHER PUBLICATIONS

Article titled "A Practical Passive Surveillance Scheme for Optically Amplified Passive Branched Optical Networks" Jointly published by Chan et al. IEE Electron Device Letters, vol. 9, No. 4, Apr. 1997, pp. 526-528.
Article titled "Fault Location Technique for In-Service Branched Optical Fiber Networks" jointly published by Sankawa et al. IEE Electron Device Letters, vol. 2, No. 10, Oct. 1990, pp. 766-768.
Article titled "Fiber-Fault Identification for Branched Access Networks Using a Wavelength-Sweeping Monitoring Source" jointly published by Chan et al. IEE Electron Device Letters, vol. 11, No. 5, May 1999, pp. 614-616.

* cited by examiner

*Primary Examiner*—Jennifer Doan
(74) *Attorney, Agent, or Firm*—Jiang Chyun IP Office

(57) ABSTRACT

An apparatus for monitoring fiber-fault in an optical networks, such as a passive optical networks, suitable for monitoring at least one fiber path in connection. The apparatus includes at least one fiber grating, having an individual central wavelength and coupling with the fiber networks; at least one reflection unit; and at least one optical gain medium unit, which is coupled between the fiber grating and the reflection unit, so as to produce at least one optical signal. The optical signal is amplified by allowing the optical signal to transmit to-and-fro between the fiber grating and the reflection unit, and then inducing excitation. The optical signal corresponding to the reflection unit has a corresponding spectrum for use in monitoring the optical network.

16 Claims, 5 Drawing Sheets

APPARATUS AND METHOD FOR MONITORING OPTICAL NETWORK

CROSS-REFERENCE TO RELATED APPLICATION

This application claims the priority benefit of Taiwan application serial no. 94130271, filed on Sep. 5, 2005. All disclosure of the Taiwan application is incorporated herein by reference.

BACKGROUND OF THE INVENTION

1. Field of the Invention

The present invention relates to an optical network technologies, and particularly to a monitoring apparatus and a monitoring method for an optical network.

2. Description of Related Art

As science and technologies developing rapidly, network technology is developed for long distance information transmitting/receiving. Networks have now been important tools for information communication. Among many kinds of networks, optical network is extremely highlighted since it can transmit large amount of information and occupies small space. However, the medium for constructing an optical network, optical fibers are mechanically weak and easy to be broken. Therefore, fiber-faults such as broken points or other quality defects in an optical fiber are usually need to be monitored.

Conventional methods for monitoring broken points include two typical ways. One is using an optical time domain reflectometer (OTDR) for monitoring the optical network. The other is employing a combination of an optical fiber amplifier and a fiber Bragg grating (FBG). FIG. 1 is a schematic structural view for illustrating the OTDR method. Referring to FIG. 1, an optical network 100 includes a plurality of fiber channels or fiber branches, for example 5 fiber channels herein. The fiber channels are all coupled to an optical splitter 102. The optical splitter 102 is adapted for splitting optical signals inputted from the OTDR 104 into the fiber channels. A monitoring unit 106 is coupled to the optical splitter 102 for monitoring levels of the optical signals. FIG. 2 is a schematic diagram for illustrating levels of signals monitored by the monitoring unit 106 of FIG. 1. When the fiber channels are operating properly, the levels of the optical signals are sustained at a higher level 110. When for example there is a broken point 108 in a fiber channel 1, a lower level of optical signals can be detected. The OTDR method has an advantage of being capable of knowing the position of the broken point 108. However, under an entire network structure, which fiber is broken can not be identified. Although some prior arts also propose to use a plurality of OTDR for one to one monitoring the fiber channels, it is incredibly expansive and uneasy to perform.

Referring to FIG. 3, it illustrates a conventional optical fiber amplifier method. According to this method, each fiber channel has a fiber Bragg grating (FBG) 101 disposed thereby, each of the FBG having a specific central wavelength. To monitor each of the fiber channels, an optical fiber amplifier 112 generates an optical signal, and a fiber loop type laser unit 114, e.g., erbium-doped fiber amplifier (EDFA), further amplifies the optical signal for checking each fiber channel. The method using optical amplifier is not convenient to operate, and the optical amplifier is relatively expansive. Particularly, an optical fiber amplifier can support limited optical fibers under such a conventional network structure. If many optical fiber amplifiers are used, it will be more expansive. Therefore, the optical fiber amplifier method is not an ideal way either.

Therefore, a fiber-fault monitoring apparatus and a monitoring method having better monitoring efficiency and lower cost are highly demanded.

SUMMARY OF THE INVENTION

The invention provides an apparatus for monitoring an optical network, which is adapted for simultaneously judging the workability, e.g., whether there is any broken point or quality defect in each optical fiber by monitoring a frequency spectrum.

The invention provides a method for monitoring an optical network, which is adapted for simultaneously judging the workability, e.g., whether there is any broken point or quality defect in each optical fiber by monitoring a frequency spectrum.

The present invention uses a fiber grating and a reflection unit coupled to two ends of an optical gain medium unit and allows the optical signals for reflecting to-and-fro therebetween. An optical gain medium unit disposed therebetween amplifies the optical signals, by which a frequency spectrum can be obtained for judging the workability for each of the optical fibers in use.

The present invention proposes an apparatus for monitoring an optical network, adapted for monitoring at least one optical network. The apparatus includes at least one fiber grating, coupled to the optical network and having a specific central wavelength; at least one reflection unit; and at least one optical gain medium unit, coupled in the optical network between the fiber grating and the reflection unit for generating at least one optical signal. The optical signal transmits to and fro between the fiber grating and the reflection unit, and the optical gain medium unit amplifies the optical signal. The optical signal from a different reflection unit corresponds a different frequency spectrum, which is used for monitoring optical networks.

According to an embodiment of the invention, if the foregoing frequency spectrum does not have a reflection spectrum at the specific central wavelength, then it is judged whether the optical network is qualified for design requirement. For example, occurrence of the situations of broken point or poor operating efficiency is checked.

According to an embodiment of the invention, the foregoing optical gain medium unit, for example, includes: an optical splitter, having a first terminal and a second terminal, the first terminal of the optical splitter being coupled to the fiber grating; an optical coupler, having a first terminal and a second terminal, the first terminal of the optical coupler being coupled with the second terminal of the optical splitter; and an optical amplifier, coupled between the second terminal of the optical coupler and the reflection unit for generating and amplifying the optical signal.

According an embodiment of the invention, the optical coupler further includes a third terminal for monitoring a frequency spectrum of the optical signal, wherein a plurality of corresponding resonant peaks are simultaneously monitored for determining any abnormal in the coupled optical networks.

According an embodiment of the invention, the optical amplifier is an inhomogeneous-broadening optical amplifier.

The present invention further proposes a method for monitoring an optical network, adapted for monitoring at least one optical network. The method includes: providing at least one fiber grating, having a specific central wavelength; coupling the fiber grating to the corresponding optical network; providing at least one reflection unit; generating at least one optical signal, the optical signal being transmitted to and fro between the fiber grating and the reflection unit and being amplified therebetween; monitoring a frequency spectrum of the optical signal and judging whether there is a peak corresponding to the specific central wavelength.

According to an embodiment of the invention, the step of generating the optical signal includes using an optical amplifier having an inhomogeneous broadening characteristic.

According to an embodiment of the invention, the step of generating the optical signal further includes: separating the fiber grating; using an optical amplifier having an inhomogeneous broadening characteristic, for generating the optical signal; and coupling the separated fiber grating with the optical coupler for allowing the optical signal reflecting to an fro between the fiber grating and the reflection unit.

The present invention employs a fiber grating and a reflection unit performing a function of reflective mirrors for a general optical amplifier, an optical gain medium unit amplifying an optical signal reflecting therebetween. The employed general optical amplifier is cheap in cost and the present invention can monitor many fiber channels at a same time.

BRIEF DESCRIPTION OF THE DRAWING

The features of the invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DESCRIPTION OF THE EMBODIMENTS

Figure 5:
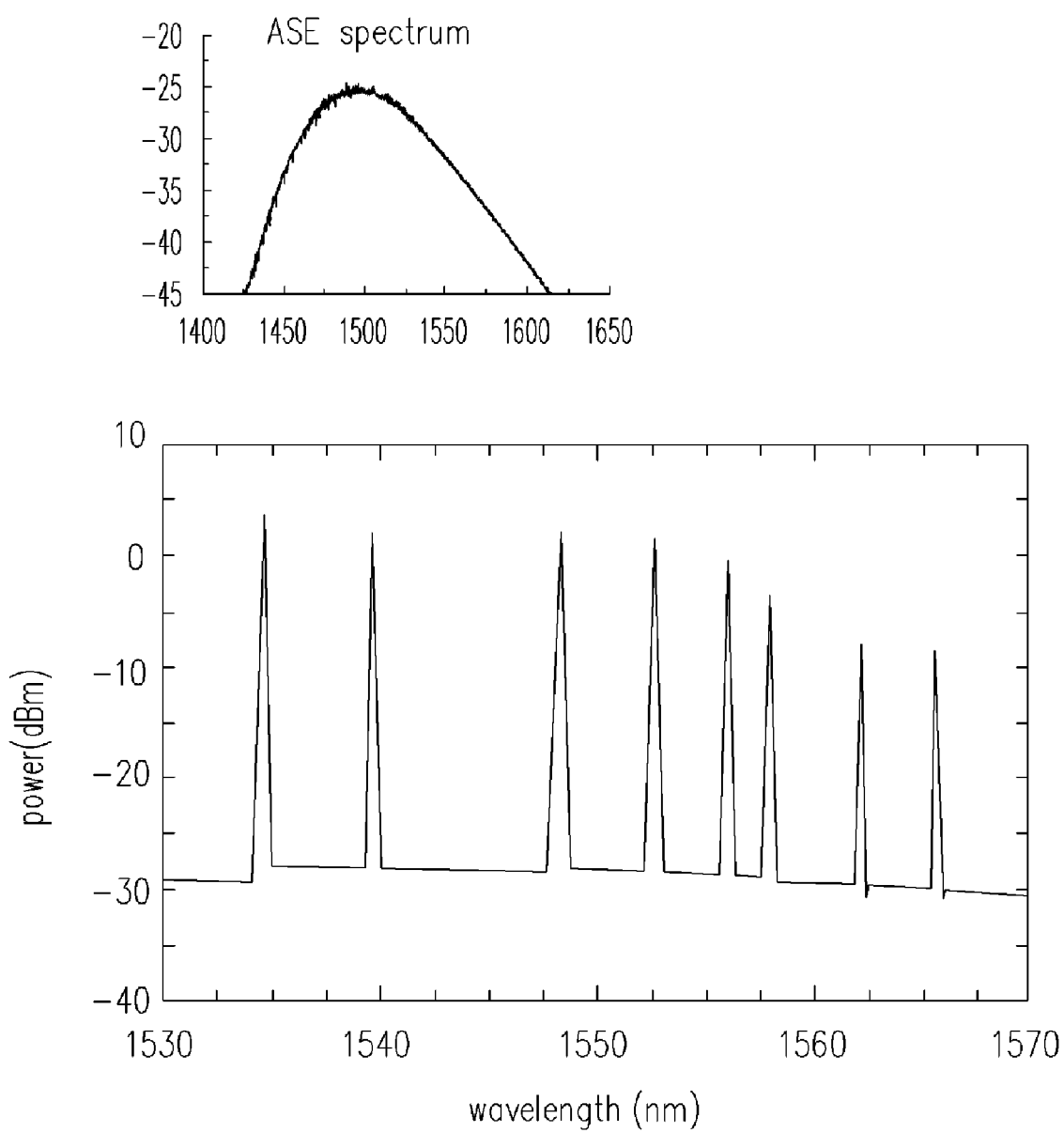
FIG. 5 shows normal frequency spectrum indicating that the optical network is properly operating, monitored by the apparatus for monitoring an optical network, according to the present invention.

The present invention proposes an apparatus and a method for monitoring an optical network, according to which workability of each fiber channel can be independently judged by monitoring a frequency spectrum. The present invention monitors broken points in an optical network, facilitating with a semiconductor optical amplifier (SOA) having an inhomogeneous broadening characteristic and a fiber grating. In stead of using an EDFA having a homogeneous broadening characteristic, which can not use the laser resonant mechanism and can basically only generate three wavelengths, the present invention monitors the optical network with a laser resonating approach, thus obtaining more than three wavelengths. According to the experimental result, eight wavelengths have been achieved. Each wavelength indicates a corresponding fiber branch. More wavelengths can be further obtained for monitoring an optical network, e.g., a passive optical network, if the resolution for peaks of the frequency spectrum as shown in FIG. 5 is further improved. In another hand, SOAs are much cheaper than OTDRs and EDFAs, and the present using an SOA is lower in cost.

Figure 1:
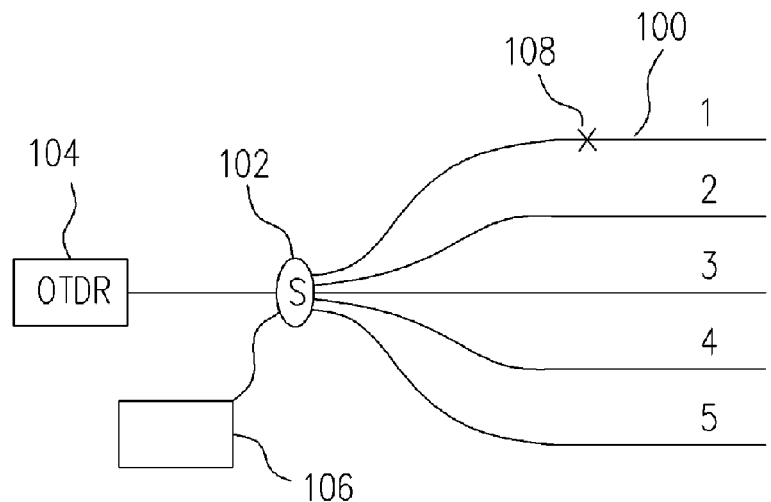
FIG. 1 is a schematic structural view for illustrating the OTDR method.
Figure 2:
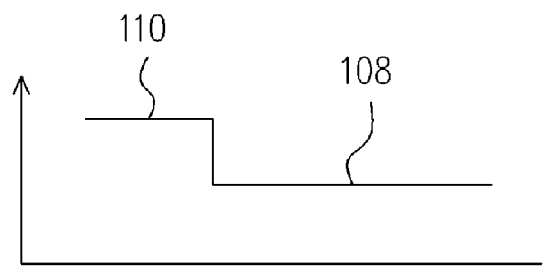
FIG. 2 is a schematic diagram for illustrating levels of signals monitored by the monitoring unit 106 of FIG. 1.
Figure 3:
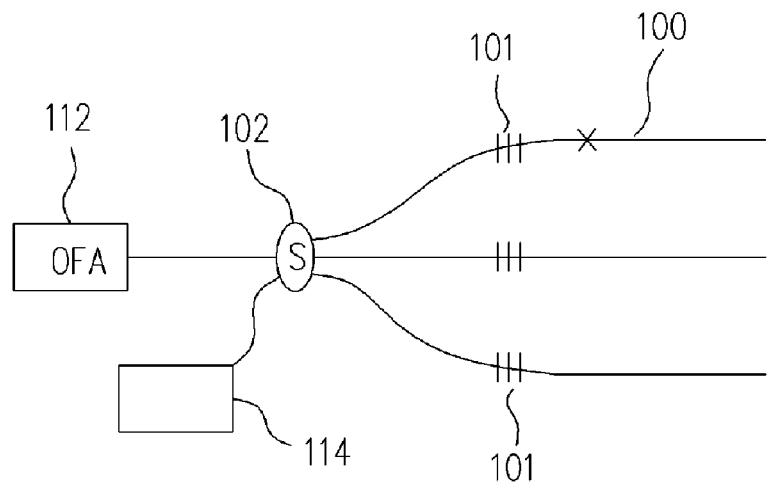
FIG. 3 illustrates a conventional optical fiber amplifier method.
Figure 4:
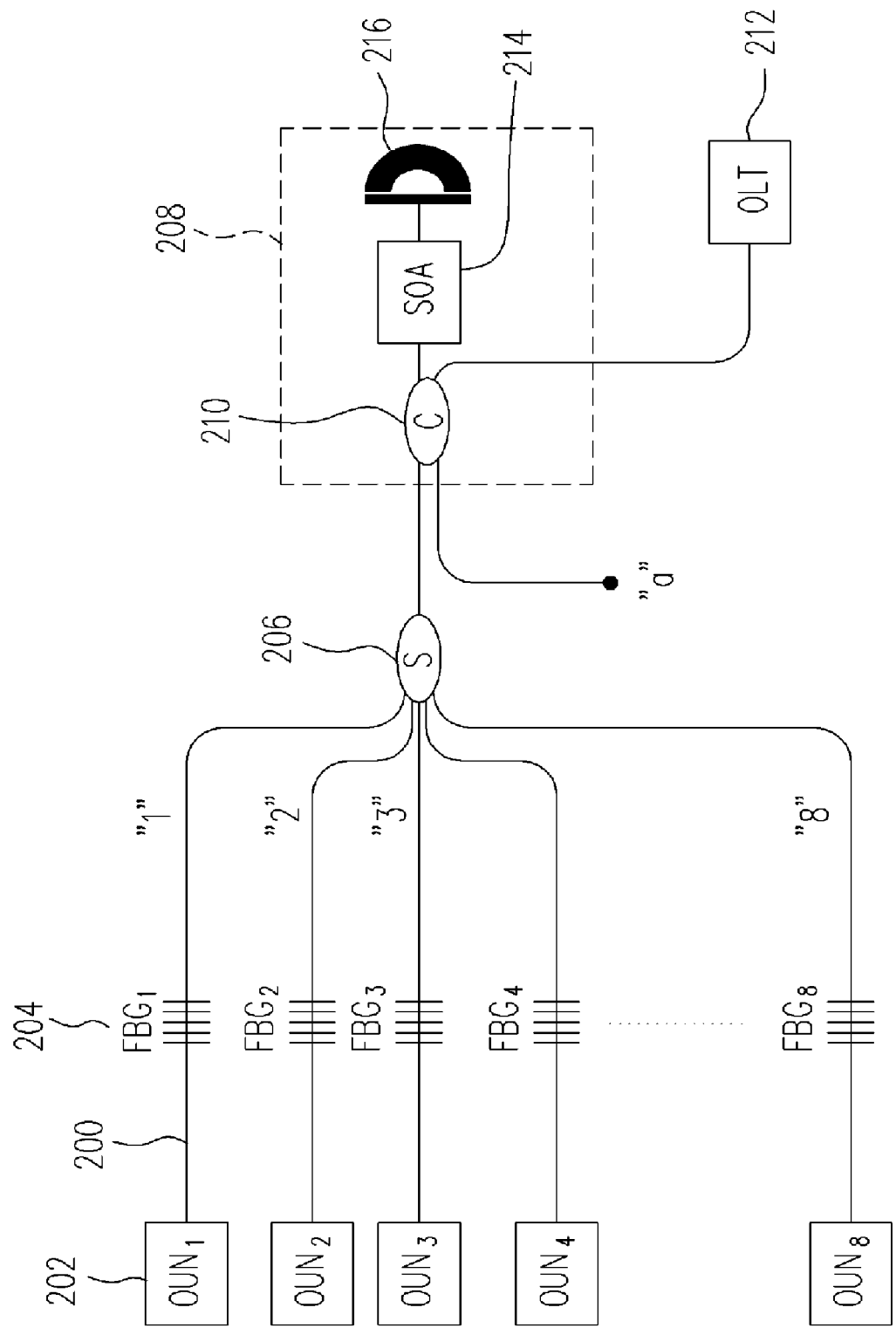
FIG. 4 is a schematic structural view for illustrating an apparatus for monitoring an optical network according to an embodiment of the invention.

FIG. 4 is a schematic structural view for illustrating an apparatus for monitoring an optical network according to an embodiment of the invention. Referring to FIG. 4, at least one optical network 202 is to have its quality, e.g., broken point or poor performance, being monitored. According to an embodiment, eight optical network units 202, $ONU_1$, $ONU_2$ ... $ONU_8$, are monitored simultaneously at respectively eight fiber branches. Each of the eight optical network units 202 is coupled with an optical splitter 206 via an optical fiber 200. The optical splitter 206 for example is a 1×8 optical splitter. It is to be noted that each optical branch has an optical grating 204 disposed at the corresponding optical fiber 200. Each fiber grating 204 has a specific central wavelength, and different fiber gratings have specific central wavelengths different from one another for identifying different optical network units 202 from each other. The fiber gratings 204 can be any kinds, and typically are FBGs.

The optical splitter 206 has one terminal coupled to the optical network units 202, while the other terminal of the optical splitter 206 is adapted for receiving an optical signal generated by an optical signal generator 208. The received optical signal is then split and then transmitted respectively to the corresponding optical network units 202. The optical signal generator 208, for example, includes an optical amplifier 214. The optical amplifier 214, preferably, has an inhomogeneous broadening characteristic and for example is an SOA, which allows signals of many wavelengths being generated without being eliminated. The optical signal generated by the optical amplifier 214 is coupled into the optical splitter 206 via the optical coupler 210. Herein, the optical coupler 210 for example is a 3 dB loss optical coupler and preferably is a 1×2 optical coupler according to the embodiment. Further, the optical amplifier 214 contains a gain medium, which is adapted for amplifying an optical signal when the optical signal is transmitting to and fro therein. In order to make the optical signal capable of reflecting to and fro, an optical reflection unit 216 is disposed at another side of the optical amplifier 214. The optical reflection unit 216, for example, is an optical mirror or other reflective optical components. Generally, an optical line terminator (OLT) 212 is usually needed in the optical network. Therefore, from an "a" terminal of the optical coupler 210, the optical signal can be detected for monitoring the frequency spectrum thereof.

According to the embodiment, the fiber grating 204, corresponding to an optical network 202, has a specific central wavelength. A part of optical signals having such a wavelength is transmitted and reflected to and fro in between the fiber grating 204 and the optical reflection unit 216, in which the optical amplifier 214 amplifies the part of optical signals. Accordingly, a peak will occur at the monitored frequency spectrum. In other words, each specific central wavelength of the fiber grating 204 corresponds to a peak at the monitored frequency spectrum. Herein, according to this embodiment, eight peaks are observed in the frequency spectrum. By monitoring the existence and height of the peaks, whether there is any broken point or other quality defects in the optical network 202 can be judged accordingly.

According to an experimental arrangement, the SOA 214 is operated in the range of C-band (1520 nm to 1560 nm). And, the eight fiber gratings 204 are respectively as: $FBG_1$ having a central wavelength of 1534.56 nm and a reflection ratio of 74.7%; $FBG_2$ having a central wavelength of 1539.58 nm and a reflection ratio of 81.8%; $FBG_3$ having a central wavelength of 1548.31 nm and a reflection ratio of 91.8%; $FBG_4$ having a central wavelength of 1552.60 nm and a reflection ratio of 87.7%; $FBG_5$ having a central wavelength of 1556.06 nm and a reflection ratio of 93.9%; $FBG_6$ having a central wavelength of 1557.97 nm and a reflection ratio of 94.0%; $FBG_7$ having a central wavelength of 1562.19 nm and a reflection ratio of 87.7.7%; and $FBG_8$ having a central wavelength of 1565.65 nm and a reflection ratio of 83.8%. The reflection ratios can be adjusted according to the demanded resolution of the frequency spectrum. The 3 dB frequency widths of the fiber gratings 204 are for example 0.4 nm. The optical reflection units 216 employed herein are close to 100%, and both the fiber gratings 204 and the optical reflection units 216 are used as reflection mirrors. When an operating current is for example 200 mA, the 3 dB frequency of the SOA 214 is distributed in the range of 1485 nm to 1535 nm and the width of which is about 40 nm.

According to a conventional EDFA method, only a part of the FBGs, usually three according to experimental results, can be excited to generate optical signals having specific central wavelengths, due to the erbium ions distribution curve and its homogeneous broadening characteristic. Facilitating the inhomogeneous broadening characteristic of an SOA, according to an experiment, the present invention can obtain more optical signals having such specific central wavelengths. According to an experiment, each fiber grating having a distance of about 10 meters to the optical coupler 210 corresponds to a structural total loss of about 7 dB. Therefore, the quantity of the used FBGs is equal to the quantity of generated optical signals having specific central wavelengths. Many factors such as reflection ratios of the FBGs, cavity lengths and sizes of the gain medium of the apparatus can be adjusted for obtaining demanded quantity, power and signal to noise ratio (SNR) of optical signals having specific central wavelengths. Generally, if gaps between adjacent central wavelengths of the FBGs can be shorter, more optical signals having specific central wavelengths can be obtained, facilitating with properly adjusted gain factor. With respect to wavelengths used by conventional passive optical networks, in which 1490 nm is used for downloading and 1310 nm is used for uploading, the range form 1530 nm to 1560 nm used for monitoring will not interfere with the conventionally used wavelengths. The quantity of optical signals having specific central wavelengths, which are monitored, can be used for monitoring and judging fiber-fault of the fiber branches by an optical spectrum analyzer (OSA). The monitoring position, for example, can be set at point "a", and the OSA, for example, has a resolution of 0.05 nm.

FIG. 5 shows normal frequency spectrum indicating that the optical network is properly operating, monitored by the apparatus for monitoring an optical network, according to the present invention. Referring to FIG. 5, the upper diagram is a general diagram for showing a frequency spectrum in a larger range, and the lower one is a specific diagram in detail describing the operating portion of the frequency spectrum. According to the embodiment, there are eight peaks corresponding to eight specific central wavelengths as shown in the FIG. 5, with respect to the eight fiber gratings 204. Herein all the widths of the peaks are within a predetermined range, and it can be judged to be that there is no broken point occurred in these eight networks.

Figure 6:
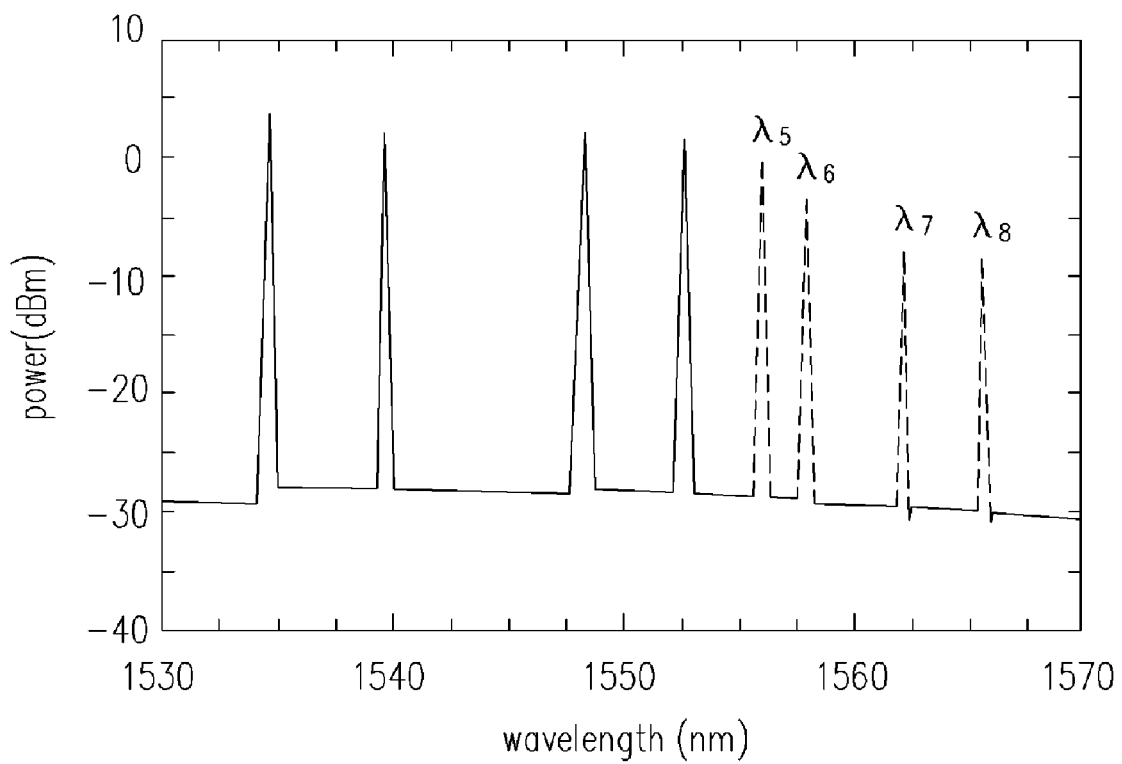
FIG. 6 shows abnormal frequency spectrum, indicating a broken point, monitored by the apparatus for monitoring an optical network, according to the present invention.

FIG. 6 shows abnormal frequency spectrum, indicating a broken point, monitored by the apparatus for monitoring an optical network, according to the present invention. Referring to FIG. 6, there are four peaks shown in the diagram, while the other previously expected four peaks indicated as broken lines $\lambda_5$ to $\lambda_8$ are not observed. Therefore, according to the result shown in FIG. 6, it can be judged that there are broken points occurred in the four optical networks corresponding to $\lambda_5$ to $\lambda_8$. It is to be noted that any abnormal peak, e.g., an abnormally high peak or an abnormally low peak, indicates a quality defect, for example a low efficiency or unexpected noise signal.

The present invention can be used for monitoring a single fiber branch, or even simultaneously monitoring many branches. If an optical amplifier 214 supports wavelengths less than the quantity of the optical networks, many sets of the present invented apparatuses can be employed.

Figure 7:
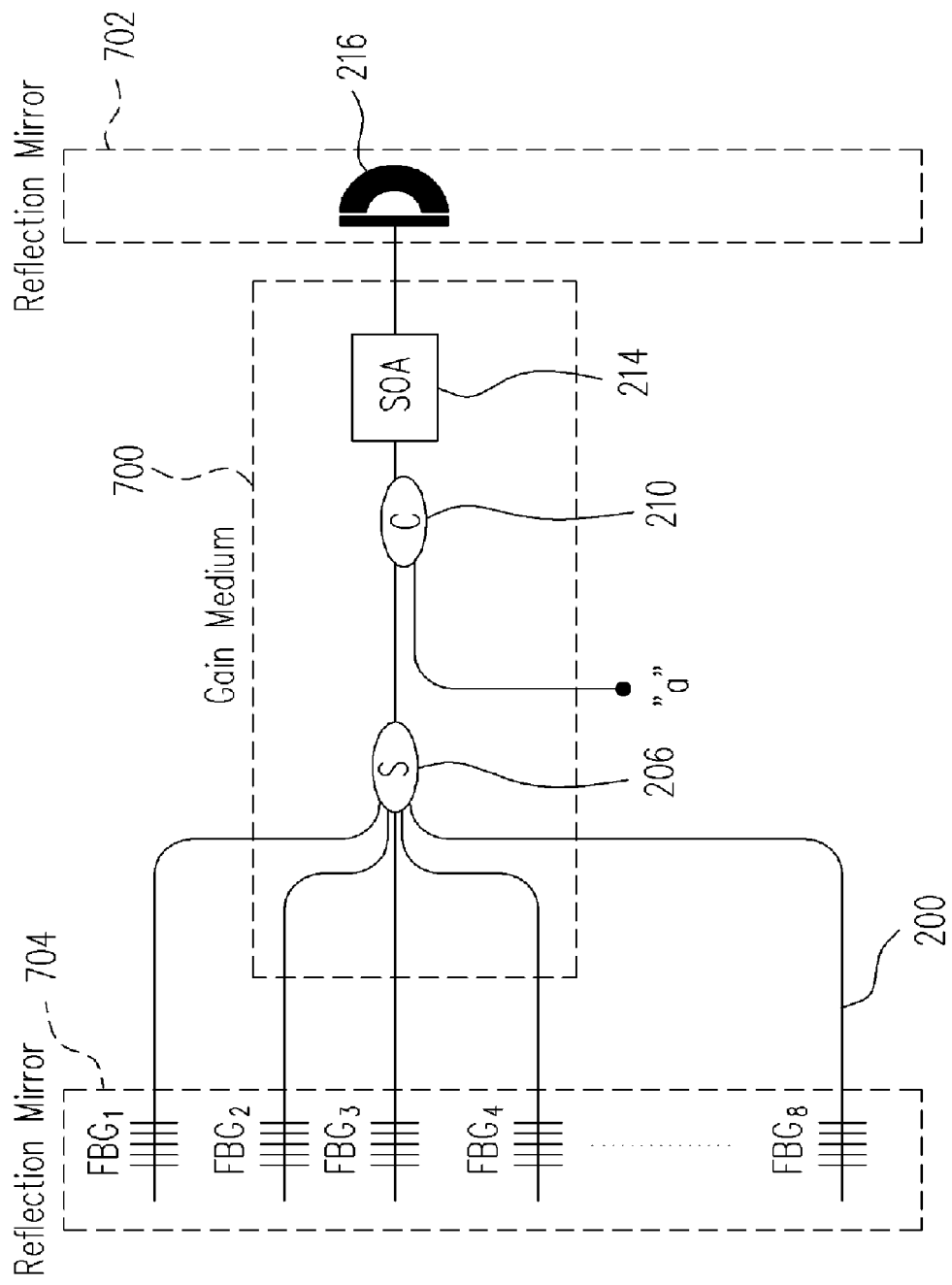
FIG. 7 is a schematic structural view for illustrating an apparatus for monitoring an optical network according to another embodiment of the invention.

Moreover, in general, the structure of the present invention as shown in FIG. 4 can be divided into three parts. As shown in FIG. 7, it is a schematic structural view for illustrating an apparatus for monitoring an optical network according to another embodiment of the invention. Referring to FIG. 7, the optical splitter 206, the optical coupler 210 and the optical amplifier 214 can taken as an integrated optical gain medium unit 700. And the at least one fiber grating can be taken as a grating reflection unit 704. And at least one optical reflection unit 216 disposed corresponding to the optical gain medium unit 700 can be taken as a reflection unit 702. It is to be noted that the quantities of respectively the fiber grating of the grating reflection unit 704, the optical gain medium unit 700 and the reflection unit 702 may vary according to the application and should not limit the invention.

As for the method for monitoring an optical network, the present invention is adapted for monitoring at least one optical network coupled to which. The method includes: providing at least one fiber grating, having a specific central wavelength; at least one reflection unit; coupling the fiber grating to the corresponding optical network; providing at least one reflection unit; generating at least one optical signal, the optical signal being transmitted to and fro in between the fiber grating and the reflection unit and being amplified therebetween; monitoring a frequency spectrum and judging whether there is a peak corresponding to the specific central wavelength.

Further, the optical signal is generated by an optical amplifier having an inhomogeneous broadening characteristic. The optical amplifier, for example, is an SOA. The step of generating an optical signal further includes separating the fiber grating and correspondingly coupling to the optical coupler 210 and the optical amplifier 214 having an inhomogeneous broadening characteristic, which is adapted for generating and amplifying an optical signal, while the optical signal reflecting to an fro between the fiber grating and the reflection unit.

In summary, the apparatus and method for monitoring an optical network according to the present invention, employ an optical gain medium unit 700, incorporating with a grating reflection unit 704 and a reflection unit 702 for amplifying optical signals corresponding to the specific central wavelengths of the fiber gratings. By monitoring the frequency spectrum, abnormal optical networks can be easily and simultaneously checked out. The present invention uses an optical amplifier having an inhomogeneous broadening characteristic, therefore the apparatus has a lower production cost.

Other modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. An apparatus for monitoring optical network, adapted for monitoring at least one optical network being coupled, comprising:
    multiple fiber gratings, coupled to the optical network and having a specific central wavelength;
    at least one reflection unit; and
    at least one optical gain medium unit, coupled between the fiber gratings and the reflection unit for generating at least one optical signal, wherein the optical signal transmits to and from between the fiber gratings and the reflection unit, and the optical gain medium unit amplifies the optical signal and a different one of the at least one reflection unit corresponds a different one of a frequency spectrum, which is used for monitoring the optical network,
    wherein each of the fiber gratings has a specific central wavelength different from each other, and the frequency spectrum of the optical signal is monitored to simultaneously observe whether or not each of multiple resonant peaks corresponding to the specific central wavelengths occurs, so as to determine which one of the connected optical networks is unqualified.

2. The apparatus for monitoring optical network according to claim 1, wherein if no a reflection spectrum corresponding to the specific central wavelengths is observed in the frequency spectrum, then the corresponding optical network can be judged as an unqualified network.

3. The apparatus for monitoring optical network according to claim 2, wherein the unqualified network has at least one broken point.

4. The apparatus for monitoring optical network according to claim 1, wherein a network having no the peak corresponding to a specific central wavelength is unqualified.

5. The apparatus for monitoring optical network according to claim 1, wherein the reflection unit comprises a reflection mirror.

6. The apparatus for monitoring optical network according to claim 1, wherein the optical gain medium unit comprises:
    an optical splitter, having a first terminal and a second terminal, wherein the first terminal of the optical splitter coupled to the fiber gratings;
    an optical coupler, having a first terminal and a second terminal, wherein the first terminal of the optical coupler is coupled with the second terminal of the optical splitter; and
    an optical amplifier, coupled between the second terminal of the optical coupler and the reflection unit for generating and amplifying the optical signal.

7. The apparatus for monitoring optical network according to claim 6, wherein the optical coupler further comprises a third terminal, for monitoring the frequency spectrum of the optical signal, wherein a plurality of corresponding peaks are simultaneously monitored for determining any abnormal one in the coupled optical networks.

8. The apparatus for monitoring optical network according to claim 6, wherein the optical amplifier has an inhomogeneous broadening characteristic.

9. The apparatus for monitoring optical network according to claim 1, wherein the optical gain medium unit comprises an optical amplifier.

10. The apparatus for monitoring optical network according to claim 9, wherein the optical amplifier has an inhomogeneous broadening characteristic.

11. The apparatus for monitoring optical network according to claim 10, wherein the optical amplifier is a semiconductor optical amplifier (SOA).

12. The apparatus for monitoring optical network according to claim 1, wherein each of the fiber gratings has a reflection ratio.

13. A method for monitoring optical network, adapted for monitoring at least one optical network, the method comprising:
    providing at least one fiber grating, each having a specific central wavelength;
    coupling the fiber grating to the corresponding optical network;
    providing at least one reflection unit;
    generating at least one optical signal, the optical signal being transmitted to and from between the fiber grating and the reflection unit and being amplified therebetween; and
    monitoring a frequency spectrum and judging whether there is a resonant peak corresponding to the specific central wavelength.

14. The method for monitoring an optical network according to claim 13, wherein the step of generating the optical signal is performed by an optical amplifier having an inhomogeneous broadening characteristic.

15. The method for monitoring an optical network according to claim 13, wherein in the step of providing at least one fiber grating, the quantity of the at least one fiber grating is more than one.

16. The method for monitoring an optical network according to claim 13, wherein the step of generating the optical signal further comprises:
    separating the fiber grating;
    using an optical amplifier having an inhomogeneous broadening characteristic, for generating the optical signal; and
    coupling the separated fiber grating with the optical coupler for allowing the optical signal to transmit to and fro between the fiber grating and the reflection unit.

* * * * *